US010303609B2

(12) United States Patent
Heirman et al.

(10) Patent No.: US 10,303,609 B2
(45) Date of Patent: May 28, 2019

(54) INDEPENDENT TUNING OF MULTIPLE HARDWARE PREFETCHERS

(71) Applicant: Intel Corporation, Santa Clara, CA (US)

(72) Inventors: Wim Heirman, Ghent (BE); Kristof Du Bois, Aalst (BE); Yves Vandriessche, Kontich (BE); Stijn Eyerman, Evergem (BE); Ibrahim Hur, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 63 days.

(21) Appl. No.: 15/718,845

(22) Filed: Sep. 28, 2017

(65) Prior Publication Data

US 2019/0095333 A1    Mar. 28, 2019

(51) Int. Cl.
*G06F 12/0862* (2016.01)

(52) U.S. Cl.
CPC .. *G06F 12/0862* (2013.01); *G06F 2212/6024* (2013.01)

(58) Field of Classification Search
CPC ............... G06F 8/4442; G06F 9/30047; G06F 9/383–9/3832; G06F 12/0862; G06F 2212/602–2212/6028
See application file for complete search history.

(56) References Cited

U.S. PATENT DOCUMENTS

| 9,483,406 | B2* | 11/2016 | Hooker | G06F 12/0862 |
| 2007/0283101 | A1* | 12/2007 | El-Essawy | G06F 12/0862 711/137 |
| 2009/0198907 | A1* | 8/2009 | Speight | G06F 12/0862 711/137 |
| 2009/0199190 | A1* | 8/2009 | Chen | G06F 9/383 718/102 |
| 2013/0332705 | A1* | 12/2013 | Martinez | G06F 11/3409 712/220 |
| 2018/0239705 | A1* | 8/2018 | Heirman | G06F 12/0862 |

OTHER PUBLICATIONS

Srinath et al. "Feedback Directed Prefetching: Improving the Performance and Bandwidth-Efficiency of Hardware Prefetchers." Feb. 2007. IEEE. HPCA 2007. pp. 63-74.*

(Continued)

*Primary Examiner* — Nathan Sadler
(74) *Attorney, Agent, or Firm* — Nicholson De Vos Webster & Elliott LLP

(57) ABSTRACT

Embodiments of apparatuses, methods, and systems for independent tuning of multiple hardware prefetchers are described. In an embodiment, an apparatus includes a processor core, a cache memory, a hardware prefetcher, and a prefetch tuner. The hardware prefetcher is to prefetch data for the processor core from a system memory to the cache memory. The prefetch tuner is to adjust a prefetch rate of the hardware prefetcher based on a fraction of late prefetches. The prefetch tuner includes a late prefetch counter to count a number of late prefetches for the hardware prefetcher, a prefetch counter to count a number of prefetches for the hardware prefetcher, and a late prefetch calculator to calculate the fraction of late prefetches based on the number of late prefetches and the number of prefetches.

17 Claims, 9 Drawing Sheets

(56) References Cited

OTHER PUBLICATIONS

Verma et al. "A Hybrid Adaptive Feedback Based Prefetcher." Mar. 2009. https://www.jilp.org/dpc/online/papers/07verma.pdf. Journal of Instruction-Level Parallelism. DPC-1.*
Ebrahimi et al. "Coordinated Control of Multiple Prefetchers in Multi-Core Systems." Dec. 2009. ACM. MICRO '09. pp. 316-326.*
Biswabandan Panda. "SPAC: A Synergistic Prefetcher Aggressiveness Controller for Multi-core Systems." Aug. 2016. https://hal.inria.fr/hal-01307538v2.*

* cited by examiner

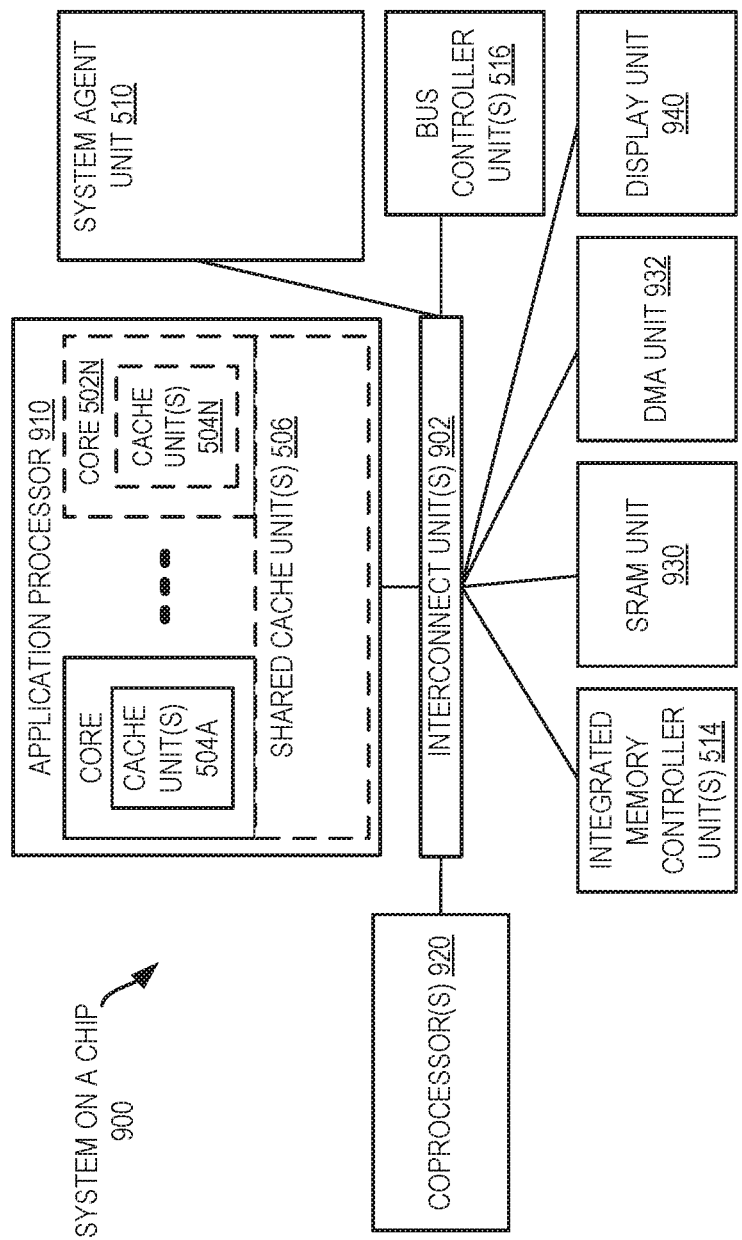

INDEPENDENT TUNING OF MULTIPLE HARDWARE PREFETCHERS

FIELD OF INVENTION

The field of invention relates generally to computer architecture.

BACKGROUND

In typical computer and information processing systems, data needed to execute an instruction may be stored in a memory. The latency of fetching the data from the memory may add to the time required to execute the instruction, thereby decreasing performance. To improve performance, techniques for fetching data before it may be needed have been developed. Such prefetching techniques involve moving the data closer to the processor in the memory hierarchy, for example, moving data from main system memory to a cache, so that if it is needed to execute an instruction, it will be take less time to fetch it.

However, the timing of prefetching is an important consideration. If the prefetch is too late, the data may not be available when needed. If the prefetch is too early, memory bandwidth and cache capacity may be unnecessarily consumed.

BRIEF DESCRIPTION OF THE DRAWINGS

The present invention is illustrated by way of example and not limitation in the figures of the accompanying drawings, in which like references indicate similar elements and in which:

FIG. 9 is a block diagram of a SoC in accordance with an embodiment of the present invention.

DETAILED DESCRIPTION

Figure 1:
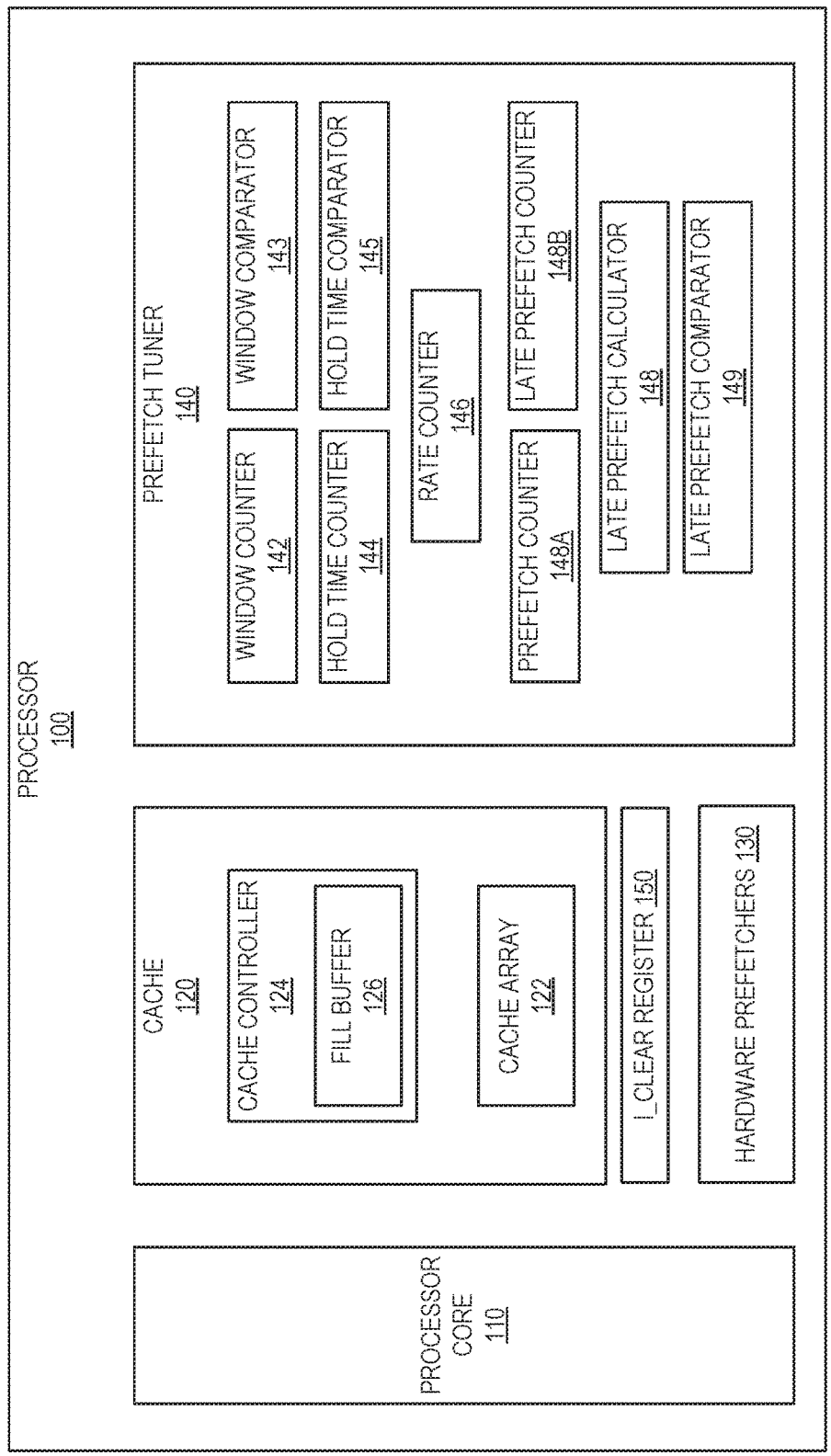
FIG. 1 is a block diagram illustrating a processor including an embodiment of the invention for independent tuning of multiple hardware prefetchers.

In the following description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

References to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Some embodiments may have some, all, or none of the features described for other embodiments. Moreover, such phrases are not necessarily referring to the same embodiment. When a particular feature, structure, or characteristic is described in connection with an embodiment, it is submitted that it is within the knowledge of one skilled in the art to effect such feature, structure, or characteristic in connection with other embodiments whether or not explicitly described.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type or content of a storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

Also, as used in descriptions of embodiments of the invention, a "/" character between terms may mean that an embodiment may include or be implemented using, with, and/or according to the first term and/or the second term (and/or any other additional terms).

Embodiments of the present invention provide techniques for prefetching data, where data may be any type of information, including instructions, represented in any form recognizable to the information processing apparatus in which the techniques are used. The data may be prefetched from any level in a memory hierarchy to any other level, for example, from a main system memory to a level one ("L1") cache, and may be used in data processing apparatuses with any other levels of memory hierarchy, between, above, or below the levels from and to which the prefetching is performed. For example, in a data processing system with a main memory, a level two ("L2") cache, and an L1 cache, the prefetching techniques may be used to prefetch data to the L1 cache from either the L2 cache or main memory, depending on where the data may be found at the time of the prefetch, and may be used in conjunction with any other hardware or software based techniques for prefetching to either the L1 or the L2 cache, or both.

When executing a set of instructions for a program, a processor may retrieve data from a memory as part of executing an instruction of the set of instructions. Retrieving the data from the memory at the time the instruction is executed may add a latency to the processing of the instruction. The latency may decrease the performance of the program.

To reduce or eliminate the latency, the processor may speculatively retrieve data from the memory and store the data in a cache prior to an execution of the instruction (referred to herein as prefetching). Storing the data in the cache may reduce the latency because the cache may be closer in distance to the processor and may provide a faster access time to data than the memory. However, the amount of time to retrieve the data for a prefetch instruction may vary because of a change in an amount of time to retrieve data from memory, a type of the memory, a change in a clock frequency of a processor, interference other cores of a multi-core system, and so forth.

When the data is not retrieved a sufficient amount of time prior to an execution of the instruction, the processor may have to wait for retrieval of the data from the memory (referred to hereafter as a late prefetch). Waiting for the data may delay the processor in executing the instruction, so a late prefetch may be a waste of time and resources. On the other hand, when the data is retrieved earlier than needed (referred to hereafter as an early prefetch), resources may be wasted because the cache may be filled with data that is not being used. For example, an early prefetch may result in the data being evicted prior to execution of the instruction.

The embodiments described herein may address the above-noted deficiencies by providing hardware to determine a desirable amount of time in which to prefetch data for the execution of an instruction for a program. When the amount of time is insufficient, the hardware may increase the amount of time to prefetch the data. When the amount of time is longer than is needed, the hardware may decrease the amount of time to prefetch the data. The hardware may adjust the amount of time to reduce the number of early prefetches and/or late prefetches.

FIG. 1 is a block diagram illustrating a processor 100 including an embodiment of the invention for independent tuning of multiple hardware prefetchers. FIGS. 4 to 9, each as described below, also illustrate processors and systems including embodiments of the invention, in which processors 490, 500, 610, 615, 770, 780, and 910 and systems 600, 700, 800, and 900 may include any or all of the blocks and/or elements shown in processor 100 of FIG. 1.

Processor 100 may represent all or part of a hardware component including one or more processors integrated on a single substrate or packaged within a single package, each of which may include multiple execution threads and/or multiple execution cores, in any combination. As such, each block and/or element shown and/or described as in FIG. 1 may be connected and/or coupled to any other block and/or element.

Each processor represented as or in processor 100 may be any type of processor, including a general purpose microprocessor, such as a processor in the Intel® Core® Processor Family or other processor family from Intel® Corporation or another company, a special purpose processor or microcontroller, or any other device or component in an information processing system in which an embodiment of the present invention may be implemented. Processor 100 and/or any core within processor 100 may be architected and designed to operate according to any instruction set architecture.

Processor 100 may include core 110 and cache 120. Cache 120 may be any level of cache in which data from a system memory may be stored for lower latency access by core 110. Processor 100 may include any number of additional cores that with which core 110 may share cache 120, and/or processor 100 may include any number of additional caches that may be dedicated to or shared by any of the cores.

Cache 120 may include cache array 122, cache controller 124, and fill buffer 126. Cache array 122 may be any size and type of memory array. Cache controller 124 may include circuitry and/or logic to manage the content of cache array 122, for example by adding data to, copying/moving data from, and/or invalidating data from cache array 122. When a fetch or prefetch request is received for data already stored in cache array 122, cache controller 124 may deny the request.

Fill buffer 126 may include any number of entries, each corresponding to a request to store/load data in cache array 122, in which to store information related to the request, for example the system memory address of the data to be loaded as well as the data itself after it is fetched but before it is loaded. The information in fill buffer 126 may be used to issue and track transactions needed to fulfill cache requests. Fill buffer 126 may also be referred to or implemented as a miss status holding register (MSHR).

Figure 2:
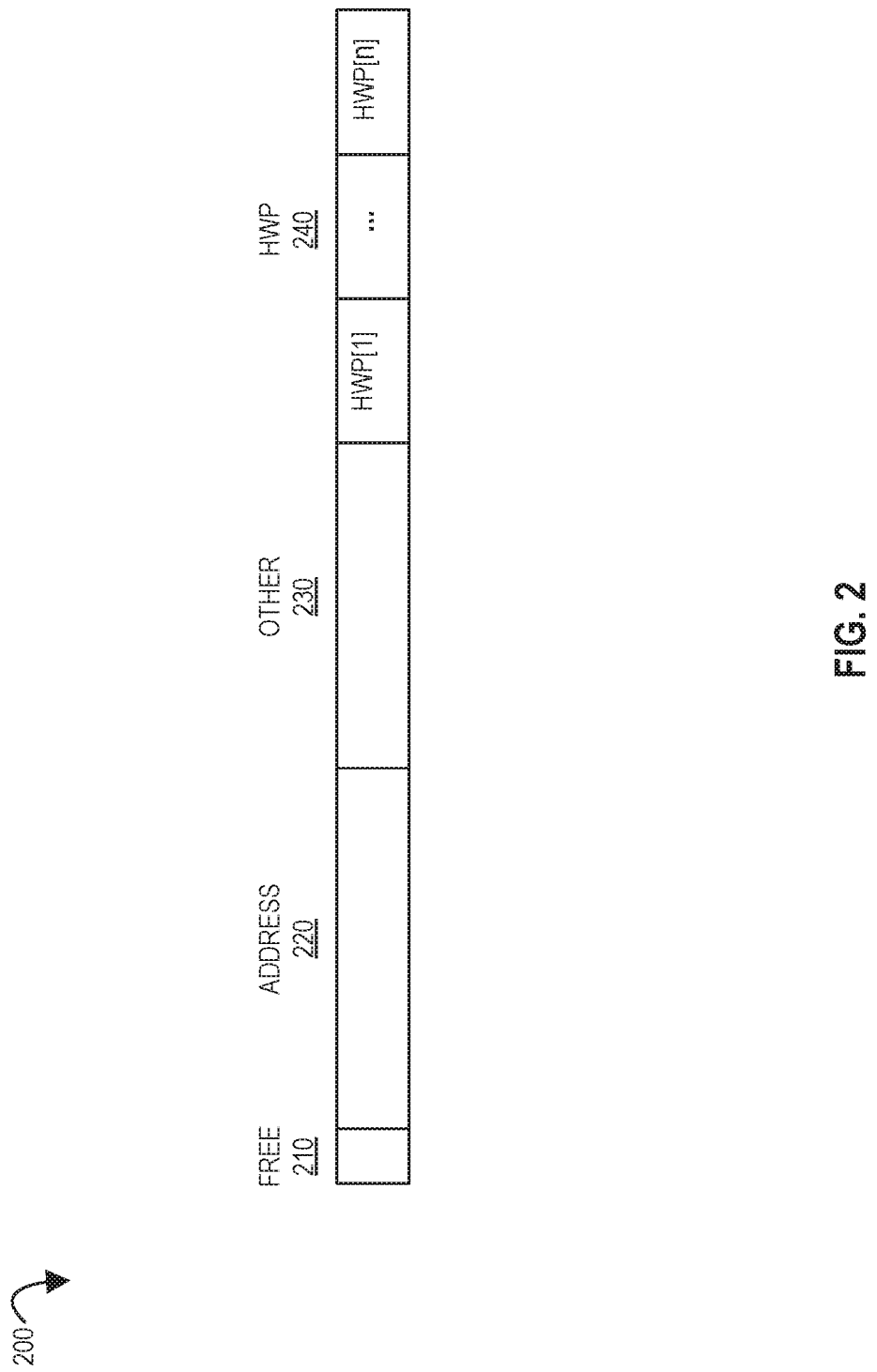
FIG. 2 illustrates an entry in a fill buffer according to an embodiment of the invention.

FIG. 2 illustrates entry 200 in fill buffer 126 according to an embodiment of the invention. Entry 200 includes free field 210, address field 220, other field 230, and hardware prefetcher (HWP) fields 240. Free field 210 may include one bit location to store an indication of whether the corresponding entry is free or occupied (e.g., a '1' may mean the entry is free, a '0' may mean the entry is occupied). Address field 220 may be used to store an address (for example, a physical address in a system memory) from which data is to be or is being fetched or prefetched. Other field 230 may be used to store any other information to be used and/or tracked and/or being used and/or tracked.

Embodiments of the invention may include any number of HWP fields 240; for example, one HWP field for each hardware prefetcher included in and/or used by processor 100. Each HWP field may include or be a single bit to indicate whether the entry corresponds to a request initiated by the corresponding hardware prefetcher. For example, the HWP[1] bit for an entry may be set in response to a hardware prefetcher corresponding to the HWP[1] bit initiating a request to be tracked by that entry. In an embodiment, each time a cache miss occurs and a fill buffer entry is allocated, the entry's HWP bits are initialized depending on whether the request was from a hardware prefetcher (in which case the HWP bit corresponding to that prefetcher is set) or another type of request (in which case all HWP bits are cleared).

Processor 100 may also include any number of hardware prefetchers 130, each of which may be any type of hardware prefetcher, each of which may operate according to its own independent prefetch algorithm. Embodiments of the invention provide for the independent tuning of the rate at which each of hardware prefetchers 130 issues prefetch requests.

Processor 100 may also include prefetch tuner 140, which may be implemented in full or in part in logic gates, storage elements, a hardware state machine, and/or any other type of circuitry, all or parts of which may be included in a separate unit in a system agent (e.g., separate from a core) of processor 100 and/or integrated within any of the other units shown in processor 100. For example, each hardware prefetcher represented by hardware prefetchers 130 may include a separate instance of prefetch tuner 140.

Prefetch tuner 140 may include window counter 142, window comparator 143, hold time counter 144, hold time comparator 145, rate counter 146, prefetch counter 148A, late prefetch counter 148B, late prefetch calculator 148, and late prefetch comparator 149. Although shown in FIG. 1 as a single block, each of window counter 142, hold time counter 144, hold time comparator 145, rate counter 146, prefetch counter 148A, and late prefetch counter 148B may represent a separate counter and/or provide a separate count per hardware prefetcher, each of window comparator 143, hold time comparator 145, and prefetch comparator 149 may represent a separate comparator per hardware prefetcher, and late prefetch calculator 148 may represent a separate calculator and/or provide a separate calculation per hardware prefetcher. Alternatively, any number of hardware prefetchers may share any of these counters and/or calculators. Furthermore, although this description may refer to each of window counter 142, hold time counter 144, rate counter 146, prefetch counter 148A, and late prefetch counter 148B as if each is a single counter, to each of window comparator 143, hold time comparator 145, and late prefetch comparator 149 as if each is a single comparator, and to late prefetch calculator 148 as if it is a single calculator, it is to be understood that the description is providing an example of a single instance of each such counter, comparator, or calculator, and that embodiments may include multiple instances, each of which may operate according to the description. Also, any two or more of the blocks shown (for example, a counter and a corresponding comparator) may be combined into a single block.

The value counted by window counter 142 may be referred to as W or W[x], the value counted by hold time counter 144 may be referred to as H or H[x], the value counted by rate counter 146 may be referred to as R or R[x], the value counted by prefetch counter 148A may be referred to as all_hwp or all_hwp[x], the value counted by late prefetch counter 148B may be referred to as late_hwp or late_hwp[x], and the fraction calculated by late prefetch calculator 148 may be referred to as F or F[x], where the index [x] is to indicate correspondence to a hardware prefetcher identified by an index [x]. Thus, each of any number of hardware prefetchers may have its own separate copy of each variable (W, H, R, all_hwp, late_hwp, and F) such that each hardware prefetcher may be tuned or adjusted independently of every other hardware prefetcher.

Window counter 142, window comparator 143, hold time counter 144, hold time comparator 145, rate counter 146, prefetch counter 148A, late prefetch counter 148B, late prefetch calculator 148, and late prefetch comparator 149 may operate as described below and according to the description of FIG. 3 below. The operation of each such counter may be described as incrementing or decrementing per clock cycle or other event; however, each may operate in the opposite way. For example, a counter described as incrementing towards a threshold may instead be implemented as decrementing towards a threshold, and vice versa. Furthermore, taking an action in response reaching a threshold may be implemented as taking the action in response to the counter value equaling the threshold or in response to the counter value passing the threshold.

Upper and/or lower thresholds, maximum and/or minimum values, and/or initial values for each counter and/or comparator may be hardwired or programmable. Counters and/or comparators may be loaded with an initial value by default or through the execution/operation of software, firmware, or hardware. Accordingly, various embodiments may include one or more registers or storage locations, not shown, to store these values.

In an embodiment, window counter 142 may start from an initial value, for example Wpos as described below, and decrement toward zero. Every W cycles, as measured by window counter 142, the prefetch rate R may be adjusted. Window counter 142 may be reloaded with Wpos (for example, 100,000) for measuring a window that determines the frequency at which the prefetch rate R may be increased, and it may be reloaded with a value Wneg (for example, 25,000) for measuring a window that determines the frequency at which the prefetch rate R may be decreased. Various values of Wpos and/or Wneg may be used to provide for various frequencies and relative frequencies of increasing and/or decreasing the prefetch rate R.

In an embodiment, hold time counter 144 may start from an initial value of zero and increment toward Hmax (for example, 10) for measuring an elapsed hold time that determines a period during which the prefetch rate R may be held constant before being decreased.

In an embodiment, rate counter 146 may start from an initial value Rmin (for example, 1) and increment toward Rmax (for example, 10) for providing a prefetch rate.

In an embodiment, prefetch counter 148A may start from zero and be incremented each time a prefetch is requested by the corresponding hardware prefetcher, and late prefetch counter 148B may start from zero and be incremented each time a prefetch that was requested by the corresponding hardware prefetcher is determined to be a late prefetch. For example, each time an HWP[x] bit in a fill buffer entry is set, the all_hwp[x] counter is incremented. If another hardware prefetcher [y] launches a prefetch request for an address that is already outstanding from another hardware prefetch request (any HWP[x] is set for x not equal to y), that entry's HWP[y] is also set and the all_hwp[y] counter is incremented. Therefore, when multiple hardware prefetchers try to prefetch the same line, each such prefetcher will get credit if the line proves useful, making the algorithm more resilient to fluctuations based on which prefetcher fetches a line first.

In an embodiment, the existing cache miss handling logic may be used to increment the late_hwp counters. An application load or store that results in a cache miss triggers a check of the fill buffer to filter out duplicate requests to the same cache line. If there is such a match in the fill buffer, the matching entry's HWP bits are checked. If any are set, the corresponding late_hwp counters are incremented and the entry's HWP bits are cleared.

In an embodiment, late prefetch calculator 148 may calculate the fraction F of late prefetches per all prefetches for a corresponding hardware prefetcher, as further described below. In an embodiment, F may be compared (for example, by late prefetch comparator 149) to a late prefetch fraction threshold Fmax (for example, 0.01).

Processor 100 may also include interval clear register 150, which may represent a programmable register or other storage location in which an interval clear value may be stored by software, which may be used as described below.

Figure 3:
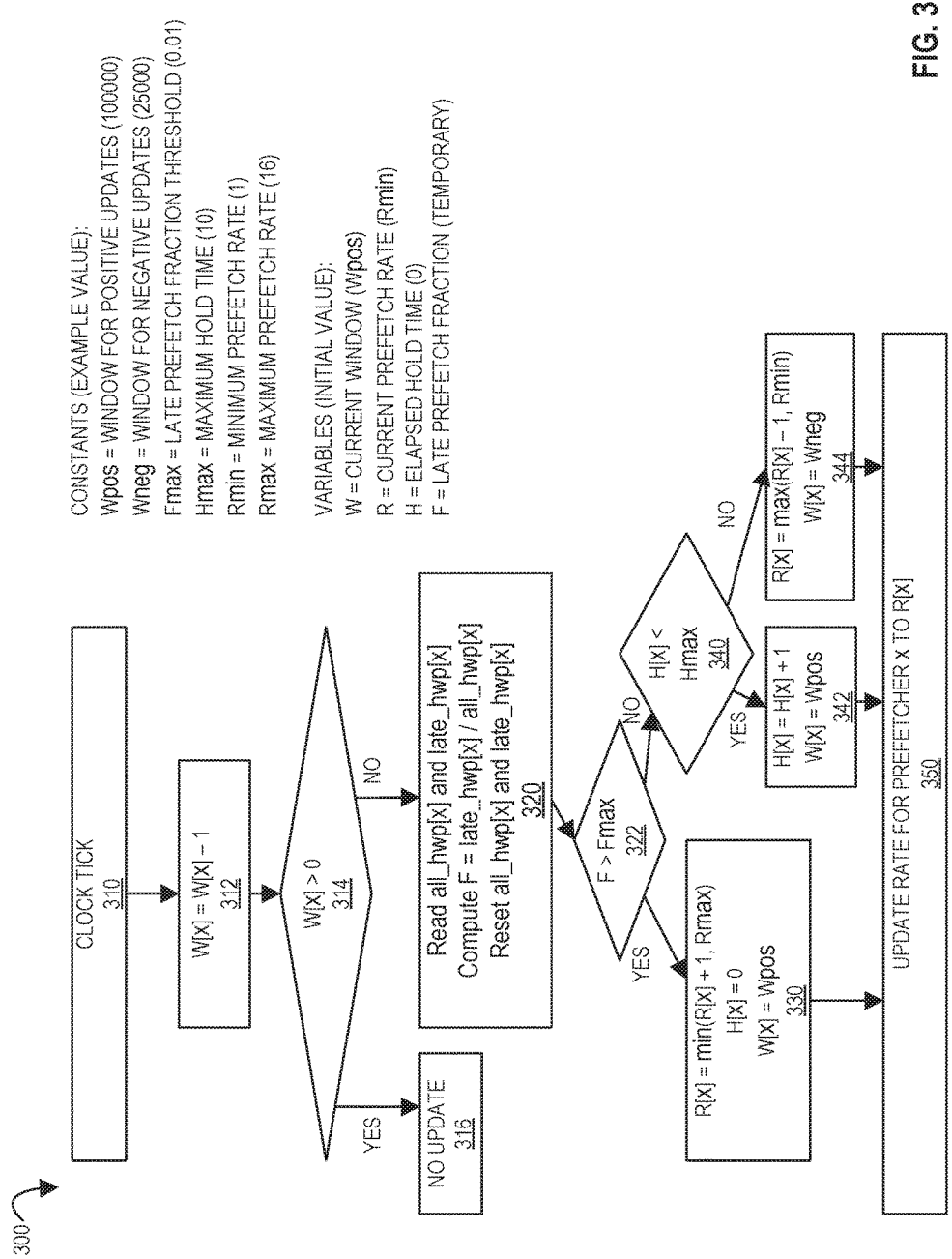
FIG. 3 is a flow diagram illustrating a method for independent tuning of multiple hardware prefetchers according to an embodiment of the invention.
Figure 4:
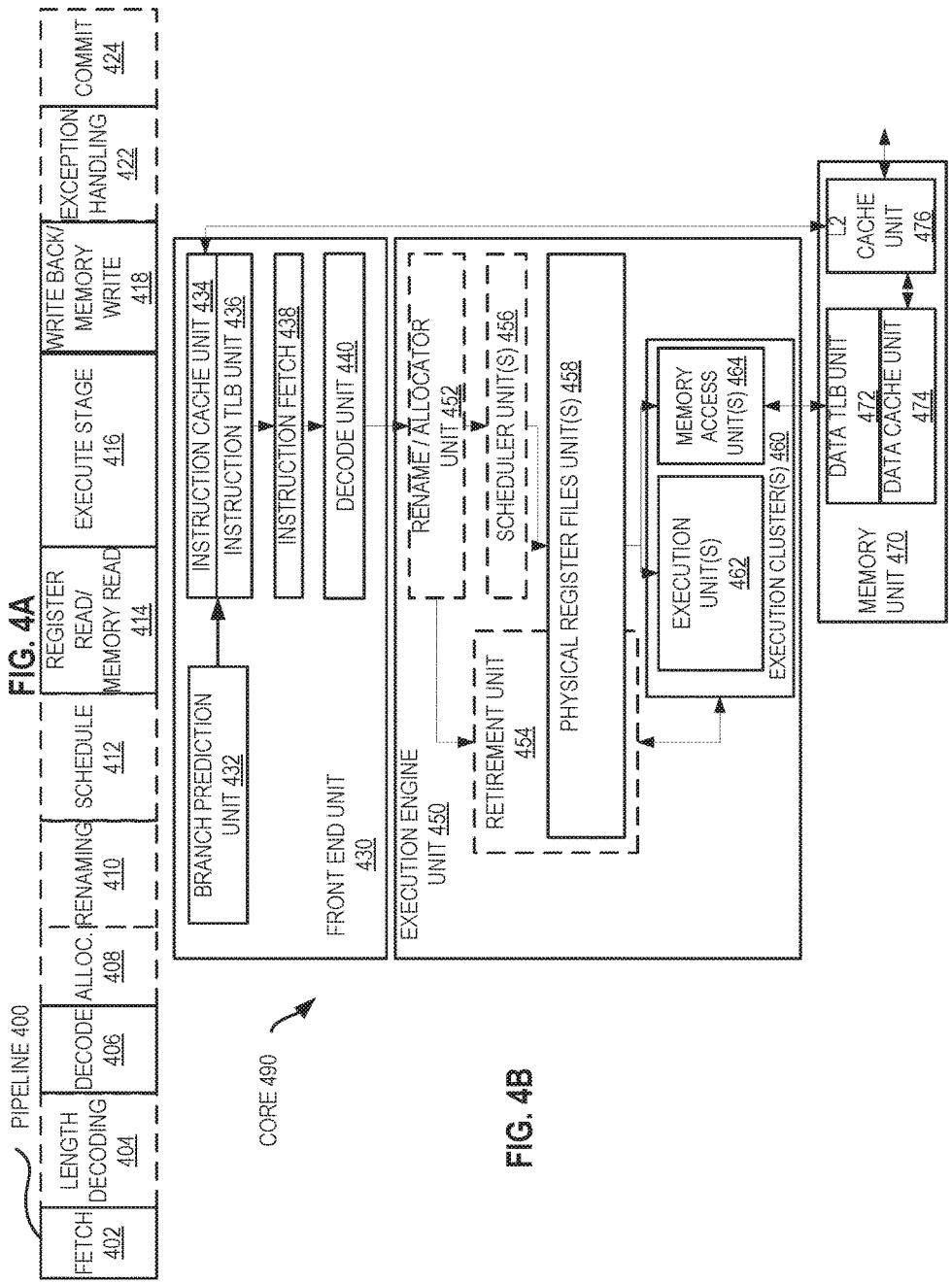
FIG. 4A is a block diagram illustrating both an exemplary in-order pipeline and an exemplary register renaming, out-of-order issue/execution pipeline according to embodiments of the invention.
FIG. 4B is a block diagram illustrating both an exemplary embodiment of an in-order architecture core and an exemplary register renaming, out-of-order issue/execution architecture core to be included in a processor according to embodiments of the invention.

FIG. 3 is a flow diagram illustrating a method 300 for independent tuning of multiple hardware prefetchers according to an embodiment of the invention. For purposes of illustration, the description of method 300 may refer to elements of processor 100; however, method embodiments of the invention are not limited to these illustrative details.

In block 310 of method 300, a clock tick may indicate the beginning of a clock cycle of processor 100, within which time period prefetch tuner 140 may operate to perform each of the other blocks shown in method 300. In block 312, in response to the clock tick, window counter 142 may be decremented. In block 314, the count W of window counter 142 may be evaluated to determine if it is above zero, for example by window comparator 143. If so, then method 300 continues in block 316, in which the prefetch rate R is not adjusted. If not, then method 300 continues in block 320.

In block 320, the fraction F of late prefetches per all prefetches may be calculated, for example by late prefetch calculator 148 dividing the value from late prefetch counter 148B by the value from prefetch counter 148A. Block 320 may include resetting (for example, to zero) prefetch counter 148A and late prefetch counter 148B after performing the calculation.

In block 322, the fraction F of late prefetches may be evaluated to determine if it is above a predetermined late prefetch fraction threshold Fmax. If F is greater than Fmax, it may be desired to increase the prefetch rate R, so method 300 continues in block 330. If not, it may be desired to hold constant or decrease the prefetch rate R, so method 300 continues in block 340.

In block 330, the prefetch rate R may be adjusted, for example by incrementing rate counter 146, unless it is already equal to a maximum prefetch rate Rmax. Also, the count H of hold time counter 144 may be reset, for example to zero, and the count W of window counter 142 may be reset, for example to Wpos.

In block 340, the count H of hold time counter 144 may be evaluated to determine if it is below Hmax, for example by hold time comparator 145. If so, it may be desired to hold constant the prefetch rate R, so method 300 continues in block 342. If not, it may be desired to decrease the prefetch rate R, so method 300 continues in block 344.

In block 342, the count H of hold timer counter 144 may be incremented, and the count W of window counter 142 may be reset, for example to Wpos. In block 342, the prefetch rate R is not adjusted.

In block 344, the prefetch rate R may be adjusted, for example by decrementing rate counter 146, unless it is already equal to a minimum prefetch rate Rmin. Also, the count W of window counter 142 may be reset, for example to Wneg.

From blocks 330, 342, and 344, method 300 continues in block 350. In block 350, the rate R[x} for the corresponding hardware prefetcher [x] may be adjusted to R.

Therefore, embodiments of the invention provide for different hardware prefetchers for and/or within a processor to use different prefetch algorithms and be independently tuned or adjusted, which may be desirable for a variety of reasons. For example, different hardware prefetch characteristics may be desired for different types and configurations of memory (for example, multichannel dynamic random access memory (MCDRAM), MCDRAM-as-cache, non-volatile memory (NVM), double data rate (DDR), etc.) and/or different prefetching techniques (e.g., stream, global history buffer (GHB), irregular stream buffer (ISB), etc.).

Furthermore, the prefetch rate R[x] may be used differently by different prefetchers. For example, the R[x] value may be converted using a mapping function that depends on the type of prefetcher. For a simple stream prefetcher, the rate may be controlled by setting the prefetch degree, which is the number of consecutive lines to fetch for each stream. The mapping may be made non-linear, so the prefetch degree goes up quickly for small values of R[x], while providing more fine-grained control at larger degrees. More complex prefetch algorithms may have multiple parameters that may all be controlled by the R[x] variable. Table 1 shows example mappings for three types of prefetchers.

TABLE 1

| Prefetcher | Parameter | R = 1 | R = 2 | R = 3 | R = 4 | R = 5 | R = 6 | R = 7 | R = 8 |
|---|---|---|---|---|---|---|---|---|---|
| Stream | degree | 1 | 2 | 4 | 8 | 12 | 16 | 24 | 32 |
| GHB | width × depth | 1 × 1 | 2 × 1 | 2 × 2 | 3 × 2 | 4 × 3 | 4 × 4 | 6 × 4 | 6 × 6 |
| ISB | degree | 1 | 2 | 3 | 4 | 5 | 6 | 7 | 8 |

Embodiments of the invention may include a technique to handle situations in which memory accesses are bandwidth bound. For example, when an application is bandwidth bound (in other words, the processor's off-chip memory channels are saturated), issuing more prefetch requests will not improve performance; in fact, the added memory pressure is more likely to reduce performance. In this case, prefetches are most likely late (because they experience high queuing delays, they will have high latency, increasing the probability that the prefetch request is still in the fill buffer when the application tries to access the data). Therefore, in this case, it is not desirable to increase the prefetch rate (which, without the following technique, is what might happen when there is a significant amount of late prefetches).

Thus, in an embodiment, all HWP bits in the fill buffer are cleared at an interval specified by an interval clear value I_CLEAR, which may be stored by software in interval clear register 150. In an embodiment, the value of I_CLEAR may be chosen to be equal to twice the uncontended memory access latency. In an embodiment, system software may set the value based on the type of memory used (for example, DDR vs. NVM, MCDRAM-as-cache vs. MCDRAM-only, etc.).

Accordingly, when the off-chip memory bus is saturated and memory latency increases beyond I_CLEAR, the probability of an HWP bit still being set when an application hits the fill buffer is much lower, so the late_hwp counter is less likely to increment and the prefetch rate is more likely to be reduced. In contrast, when the application is not bandwidth bound, the HWP bits have a lower probability of being cleared; the more likely scenario is that either the memory access completes with an HWP bit still set, or an application access hits the fill buffer and sees the HWP bit set, leading to the intended increment of the late_hwp counter. Note that this technique still clears the HWP bits for about half of the memory accesses that have low (uncontended) latency, but this result may be compensated for by reducing the Fmax value by a factor of two relative to its optimum value, in case the HWP bits are never cleared.

Exemplary Core Architectures, Processors, and Computer Architectures

The figures below detail exemplary architectures and systems to implement embodiments of the above.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432, which is coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit, a write mask registers unit, and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/ vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
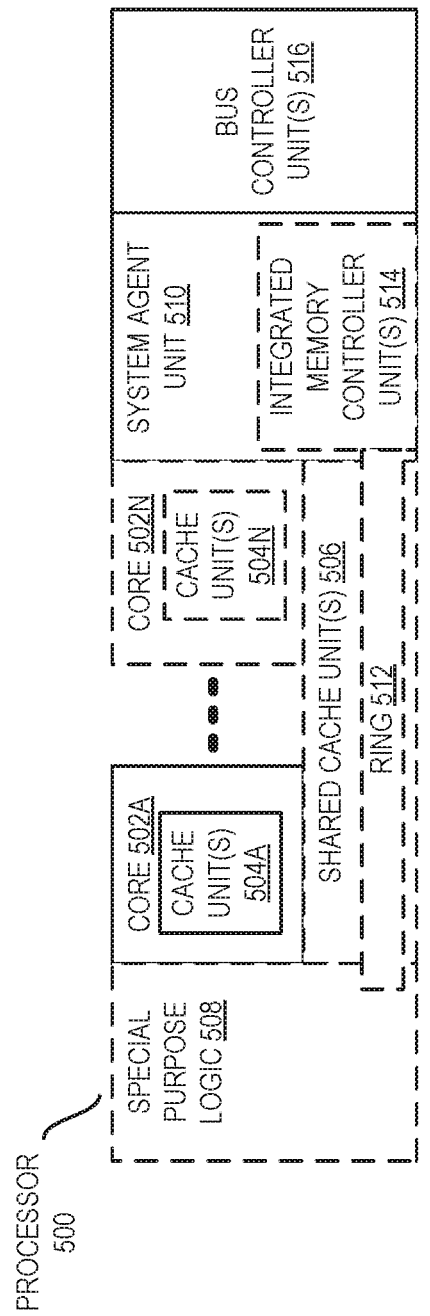
FIG. 5 is a block diagram of a processor that may have more than one core, may have an integrated memory controller, and may have integrated graphics according to embodiments of the invention.

FIG. 5 is a block diagram of a processor 500 that may have more than one core, may have an integrated memory controller, and may have integrated graphics according to embodiments of the invention. The solid lined boxes in FIG. 5 illustrate a processor 500 with a single core 502A, a system agent 510, a set of one or more bus controller units 516, while the optional addition of the dashed lined boxes illustrates an alternative processor 500 with multiple cores 502A-N, a set of one or more integrated memory controller unit(s) 514 in the system agent unit 510, and special purpose logic 508.

Thus, different implementations of the processor 500 may include: 1) a CPU with the special purpose logic 508 being integrated graphics and/or scientific (throughput) logic (which may include one or more cores), and the cores 502A-N being one or more general purpose cores (e.g., general purpose in-order cores, general purpose out-of-order cores, a combination of the two); 2) a coprocessor with the cores 502A-N being a large number of special purpose cores intended primarily for graphics and/or scientific (throughput); and 3) a coprocessor with the cores 502A-N being a large number of general purpose in-order cores. Thus, the processor 500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 506, and external memory (not shown) coupled to the set of integrated memory controller units 514. The set of shared cache units 506 may include one or more mid-level caches, such as level 2 (L2), level 3 (L3), level 4 (L4), or other levels of cache, a last level cache (LLC), and/or combinations thereof. While in one embodiment a ring based interconnect unit 512 interconnects the integrated graphics logic 508 (integrated graphics logic 508 is an example of and is also referred to herein as special purpose logic), the set of shared cache units 506, and the system agent unit 510/integrated memory controller unit(s) 514, alternative embodiments may use any number of well-known techniques for interconnecting such units. In one embodiment, coherency is maintained between one or more cache units 506 and cores 502-A-N.

In some embodiments, one or more of the cores 502A-N are capable of multi-threading. The system agent 510 includes those components coordinating and operating cores 502A-N. The system agent unit 510 may include for example a power control unit (PCU) and a display unit. The PCU may be or include logic and components needed for regulating the power state of the cores 502A-N and the integrated graphics logic 508. The display unit is for driving one or more externally connected displays.

The cores 502A-N may be homogenous or heterogeneous in terms of architecture instruction set; that is, two or more of the cores 502A-N may be capable of execution the same instruction set, while others may be capable of executing only a subset of that instruction set or a different instruction set.

Exemplary Computer Architectures

FIGS. 6-9 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 6:
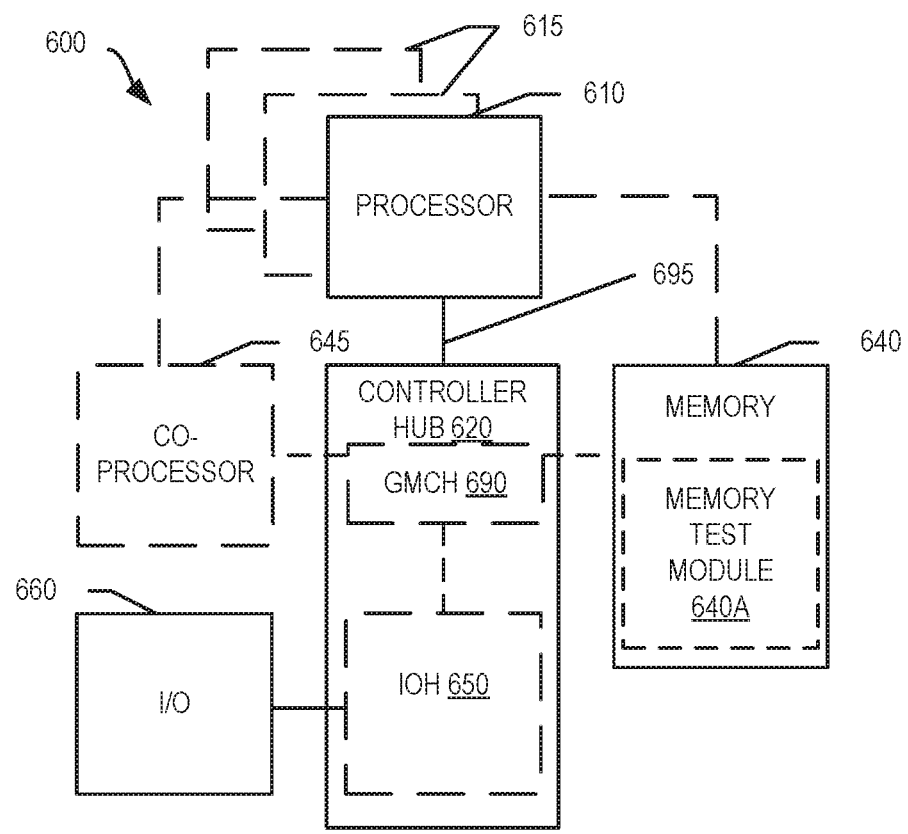
FIG. 6 is a block diagram of a system in accordance with one embodiment of the present invention.

Referring now to FIG. 6, shown is a block diagram of a system 600 in accordance with one embodiment of the present invention. The system 600 may include one or more processors 610, 615, which are coupled to a controller hub 620. In one embodiment, the controller hub 620 includes a graphics memory controller hub (GMCH) 690 and an Input/Output Hub (IOH) 650 (which may be on separate chips); the GMCH 690 includes memory and graphics controllers to which are coupled memory 640 and a coprocessor 645; the IOH 650 couples input/output (I/O) devices 660 to the GMCH 690. Alternatively, one or both of the memory and graphics controllers are integrated within the processor (as described herein), the memory 640 and the coprocessor 645 are coupled directly to the processor 610, and the controller hub 620 in a single chip with the 10H 650.

The optional nature of additional processors 615 is denoted in FIG. 6 with broken lines. Each processor 610, 615 may include one or more of the processing cores described herein and may be some version of the processor 500.

The memory 640 may be, for example, dynamic random access memory (DRAM), phase change memory (PCM), or a combination of the two. For at least one embodiment, the controller hub 620 communicates with the processor(s) 610, 615 via a multi-drop bus, such as a frontside bus (FSB), point-to-point interface such as QuickPath Interconnect (QPI), or similar connection 695.

In one embodiment, the coprocessor 645 is a special-purpose processor, such as, for example, a high-throughput MIC processor, a network or communication processor, compression engine, graphics processor, GPGPU, embedded processor, or the like. In one embodiment, controller hub 620 may include an integrated graphics accelerator.

There can be a variety of differences between the physical resources 610, 615 in terms of a spectrum of metrics of merit including architectural, microarchitectural, thermal, power consumption characteristics, and the like.

In one embodiment, the processor 610 executes instructions that control data processing operations of a general type. Embedded within the instructions may be coprocessor instructions. The processor 610 recognizes these coprocessor instructions as being of a type that should be executed by the attached coprocessor 645. Accordingly, the processor 610 issues these coprocessor instructions (or control signals representing coprocessor instructions) on a coprocessor bus or other interconnect, to coprocessor 645. Coprocessor(s) 645 accept and execute the received coprocessor instructions.

Figure 7:
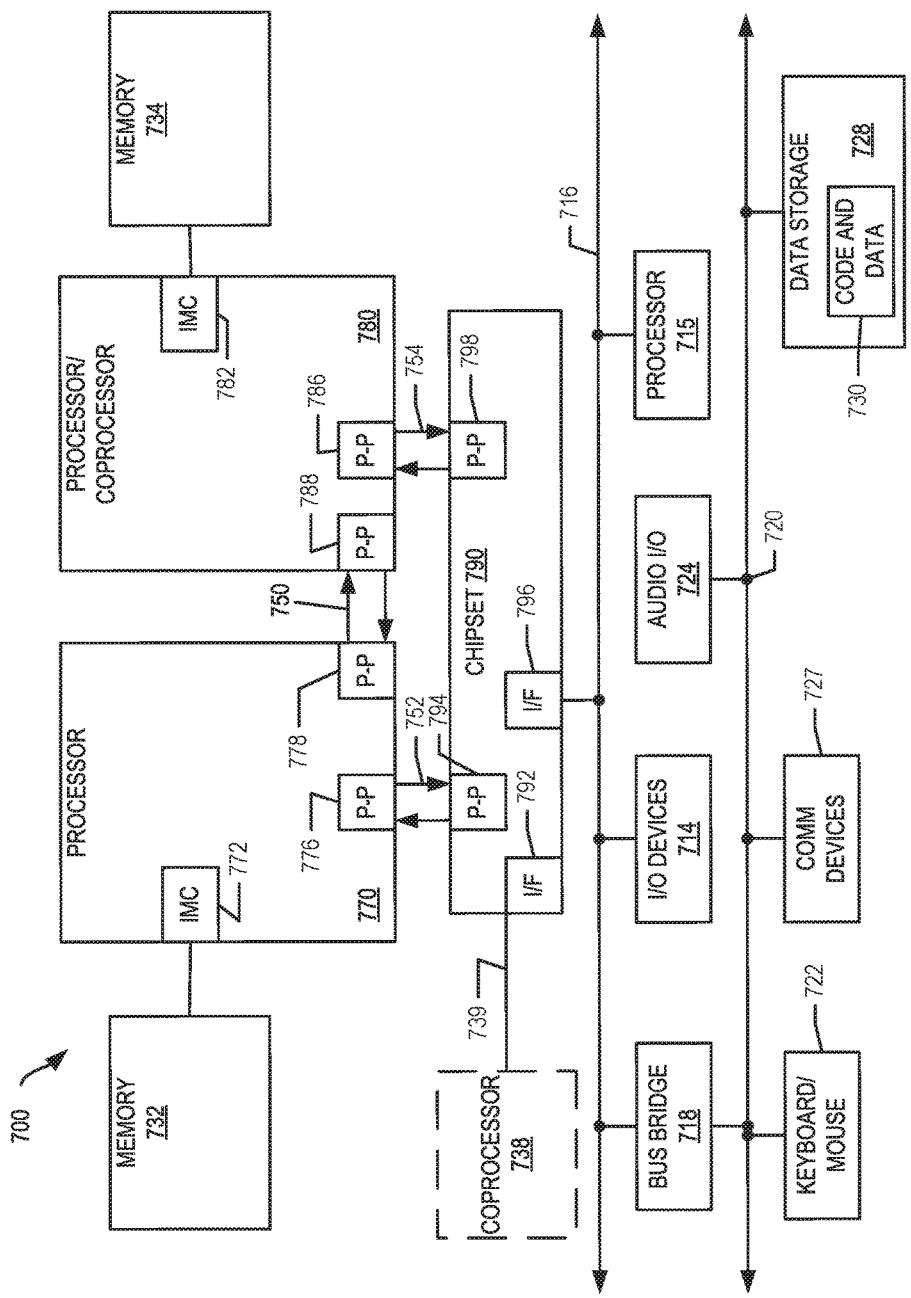
FIG. 7 is a block diagram of a first more specific exemplary system in accordance with an embodiment of the present invention.

Referring now to FIG. 7, shown is a block diagram of a first more specific exemplary system 700 in accordance with an embodiment of the present invention. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 500. In one embodiment of the invention, processors 770 and 780 are respectively processors 610 and 615, while coprocessor 738 is coprocessor 645. In another embodiment, processors 770 and 780 are respectively processor 610 and coprocessor 645.

Processors 770 and 780 are shown including integrated memory controller (IMC) units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may optionally exchange information with the coprocessor 738 via a high-performance interface 792. In one embodiment, the coprocessor 738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, one or more additional processor(s) 715, such as coprocessors, high-throughput MIC processors, GPGPU's, accelerators (such as, e.g., graphics accelerators or digital signal processing (DSP) units), field programmable gate arrays, or any other processor, are coupled to first bus 716. In one embodiment, second bus 720 may be a low pin count (LPC) bus. Various devices may be coupled to a second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to the second bus 720. Note that other architectures are possible. For example, instead of the point-to-point architecture of FIG. 7, a system may implement a multi-drop bus or other such architecture.

Figure 8:
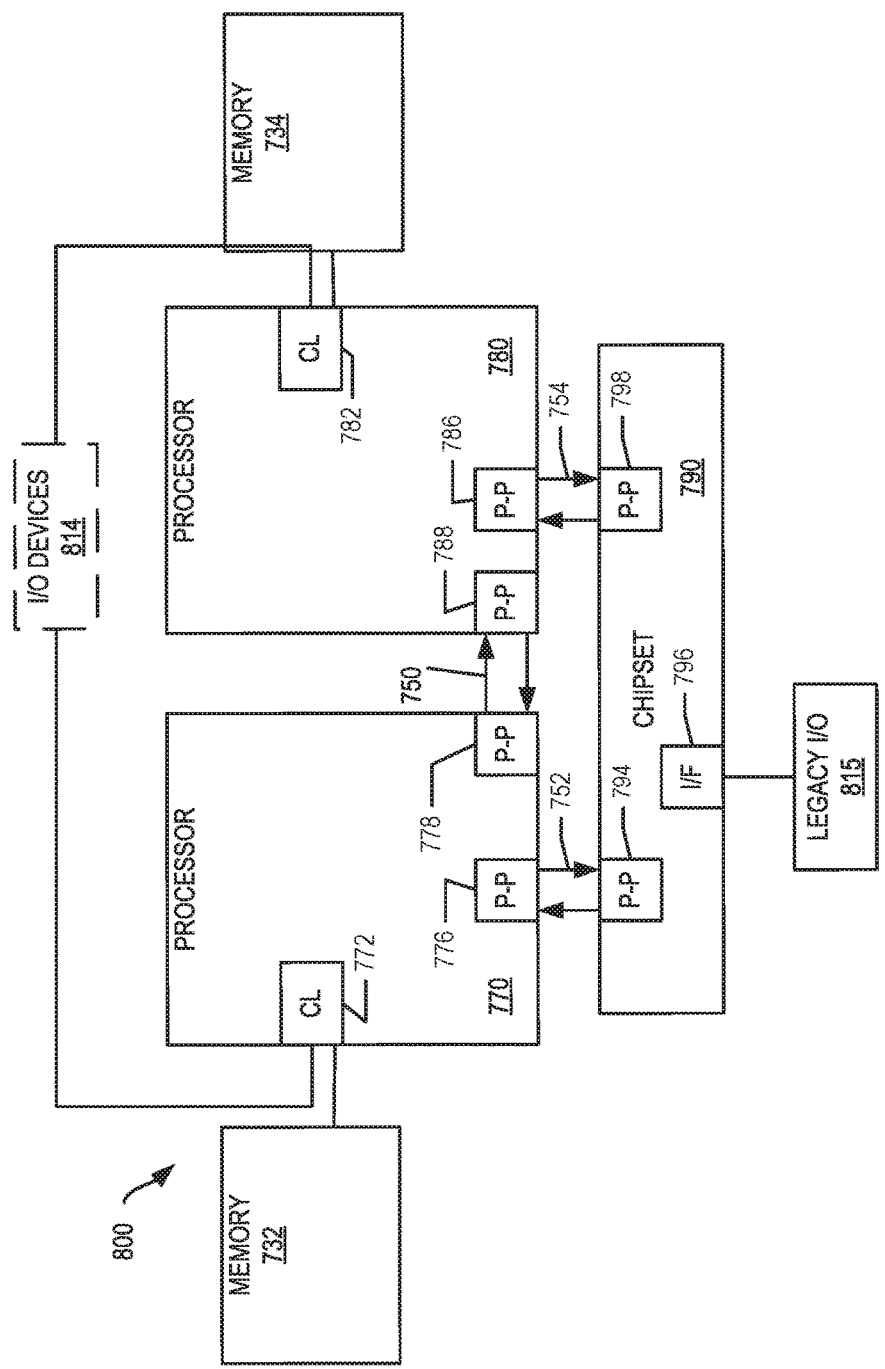
FIG. 8 is a block diagram of a second more specific exemplary system in accordance with an embodiment of the present invention.

Referring now to FIG. 8, shown is a block diagram of a second more specific exemplary system 800 in accordance with an embodiment of the present invention. Like elements in FIGS. 7 and 8 bear like reference numerals, and certain aspects of FIG. 7 have been omitted from FIG. 8 in order to avoid obscuring other aspects of FIG. 8.

FIG. 8 illustrates that the processors 770, 780 may include integrated memory and I/O control logic ("CL") 772 and 782, respectively. Thus, the CL 772, 782 include integrated memory controller units and include I/O control logic. FIG. 8 illustrates that not only are the memories 732, 734 coupled to the CL 772, 782, but also that I/O devices 814 are also coupled to the control logic 772, 782. Legacy I/O devices 815 are coupled to the chipset 790.

Referring now to FIG. 9, shown is a block diagram of a SoC 900 in accordance with an embodiment of the present invention. Similar elements in FIG. 5 bear like reference numerals. Also, dashed lined boxes are optional features on more advanced SoCs. In FIG. 9, an interconnect unit(s) 902 is coupled to: an application processor 910 which includes a set of one or more cores 502A-N, which include cache units 504A-N, and shared cache unit(s) 506; a system agent unit 510; a bus controller unit(s) 516; an integrated memory controller unit(s) 514; a set or one or more coprocessors 920 which may include integrated graphics logic, an image processor, an audio processor, and a video processor; an static random access memory (SRAM) unit 930; a direct memory access (DMA) unit 932; and a display unit 940 for coupling to one or more external displays. In one embodiment, the coprocessor(s) 920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 730 illustrated in FIG. 7, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In an embodiment, an apparatus may include a processor core, a cache memory, a first hardware prefetcher, and a prefetch tuner. The first hardware prefetcher is to prefetch data for the processor core from a system memory to the cache memory. The prefetch tuner is to adjust a first prefetch rate of the first hardware prefetcher based on a first fraction of late prefetches. The prefetch tuner includes a first late prefetch counter to count a first number of late prefetches for the first hardware prefetcher, a first prefetch counter to count a first number of prefetches for the first hardware prefetcher, and a late prefetch calculator to calculate the first fraction of late prefetches based on the first number of late prefetches and the first number of prefetches.

The apparatus may also include a second hardware prefetcher and the prefetch tuner may also be to adjust a second prefetch rate of the second hardware prefetcher based on a second fraction of late prefetches independently from the first prefetch rate, the prefetch tuner may also include a second late prefetch counter to count a second number of late prefetches for the second hardware prefetcher and a second prefetch counter to count a second number of prefetches for the second hardware prefetcher, and the late prefetch calculator may also be to calculate the second fraction of late prefetches based on the second number of late prefetches and the second number of prefetches. The apparatus may also include a fill buffer having a plurality of entries, each entry having a first location in which to store a first indication that the entry corresponds to the first hardware prefetcher and a second location in which to store a second indication that the entry corresponds to the second hardware prefetcher. The apparatus may also include a programmable register in which to store an interval clear value, the interval clear value to determine an interval for clearing the first location and the second location of each fill buffer entry. The prefetch tuner may also include a window counter to measure a first window that determines a first frequency at which the first prefetch rate is to be adjusted. The first frequency may be a frequency at which the first prefetch rate is to be increased. The window counter may also be to measure a second window that determines a second frequency at which the second prefetch rate is to be decreased. The prefetch tuner may also include a hold time counter to measure an elapsed hold time that determines a period during which the first prefetch rate is to be held constant.

In an embodiment, a method may include requesting, by a first hardware prefetcher, a first prefetch of a line of data; setting a first indicator in a fill buffer entry to indicate that the line of data is requested by the first hardware prefetcher; incrementing a first prefetch counter in response to setting the first indicator, the first prefetch counter corresponding to the first hardware prefetcher; requesting, by a second hardware prefetcher, a second prefetch of the line of data; setting a second indicator in the fill buffer entry to indicate that the line of data is also requested by the second hardware prefetcher; and incrementing a second prefetch counter in response to setting the second indicator, the second prefetch counter corresponding to the second hardware prefetcher.

The method may also include detecting a late prefetch of the line of data; incrementing a first late prefetch counter in response to detecting the late prefetch, the first late prefetch counter corresponding to the first hardware prefetcher; and incrementing a second late prefetch counter in response to detecting the late prefetch, the second late prefetch counter corresponding to the second hardware prefetcher. The method may also include detecting expiration of a first window that determines a first frequency at which a first prefetch rate is to be adjusted, the first prefetch rate corresponding to the first hardware prefetcher. The method may also include calculating, in response to detecting expiration of the first window, a first fraction of late prefetches based on the first late prefetch counter and the first prefetch counter. The method may also include comparing, in response to detecting expiration of the first window, the first fraction of late prefetches to a first late prefetch threshold. The method may also include increasing the first prefetch rate in response to determining that the first fraction of late prefetches is above the first late prefetch threshold. The method may also include comparing a first hold time counter to a first hold time threshold in response to determining that the first fraction of late prefetches is not above the first late prefetch threshold. The method may also include decreasing the first prefetch rate in response to determining that the first hold time counter is not below the first hold time threshold. The method may also include programming, by system software, an interval clear value in an interval clear register to specify a clear interval. The method may also include clearing the first indicator and the second indicator in the fill buffer entry in response to detecting expiration of the clear interval. The method may also include detecting expiration of a second window that determines a second frequency at which a second prefetch rate is to be adjusted, the second prefetch rate corresponding to the second hardware prefetcher; calculating, in response to detecting expiration of the second window, a second fraction of late prefetches based on the second late prefetch counter and the second prefetch counter; comparing, in response to detecting expiration of the second window, the second fraction of late prefetches to a second late prefetch threshold; and increasing the second prefetch rate in response to determining that the second fraction of late prefetches is above the second late prefetch threshold.

In an embodiment, an apparatus may include means for performing any of the methods described above. In an embodiment, a machine-readable tangible medium may store instructions, which, when executed by a machine, cause the machine to perform any of the methods described above.

In an embodiment, a system may include a system memory and a processor. The processor may include may include a processor core, a cache memory, a first hardware prefetcher, and a prefetch tuner. The first hardware prefetcher is to prefetch data for the processor core from a system memory to the cache memory. The prefetch tuner is to adjust a first prefetch rate of the first hardware prefetcher based on a first fraction of late prefetches. The prefetch tuner includes a first late prefetch counter to count a first number of late prefetches for the first hardware prefetcher, a first prefetch counter to count a first number of prefetches for the first hardware prefetcher, and a late prefetch calculator to calculate the first fraction of late prefetches based on the first number of late prefetches and the first number of prefetches.

The processor in the system may also include a second hardware prefetcher and the prefetch tuner may also be to adjust a second prefetch rate of the second hardware prefetcher based on a second fraction of late prefetches independently from the first prefetch rate, the prefetch tuner may also include a second late prefetch counter to count a second number of late prefetches for the second hardware prefetcher and a second prefetch counter to count a second number of prefetches for the second hardware prefetcher, and the late prefetch calculator may also be to calculate the second fraction of late prefetches based on the second number of late prefetches and the second number of prefetches. The processor in the system may also include a fill buffer having a plurality of entries, each entry having a first location in which to store a first indication that the entry corresponds to the first hardware prefetcher and a second location in which to store a second indication that the entry corresponds to the second hardware prefetcher. The processor in the system may also include a programmable register in which to store an interval clear value, the interval clear value to determine an interval for clearing the first location and the second location of each fill buffer entry. The prefetch tuner may also include a window counter to measure a first window that determines a first frequency at which the first prefetch rate is to be adjusted. The first frequency may be a frequency at which the first prefetch rate is to be increased. The window counter may also be to measure a second window that determines a second frequency at which the second prefetch rate is to be decreased. The prefetch tuner may also include a hold time counter to measure an elapsed hold time that determines a period during which the first prefetch rate is to be held constant.

What is claimed is:

1. An apparatus comprising:
   a processor core;
   a cache memory;
   a first hardware prefetcher to prefetch data for the processor core from a system memory to the cache memory;
   a prefetch tuner to adjust a first prefetch rate of the first hardware prefetcher based on a first fraction of late prefetches, the prefetch tuner including a first late prefetch counter to count a first number of late prefetches for the first hardware prefetcher, a first prefetch counter to count a first number of total prefetches for the first hardware prefetcher, and a late prefetch calculator to calculate the first fraction of late prefetches based on the first number of late prefetches divided by the first number of total prefetches.

2. The apparatus of claim 1, further comprising a second hardware prefetcher and wherein the prefetch tuner is also to adjust a second prefetch rate of the second hardware prefetcher based on a second fraction of late prefetches independently from the first prefetch rate, the prefetch tuner also including a second late prefetch counter to count a second number of late prefetches for the second hardware prefetcher and a second prefetch counter to count a second number of prefetches for the second hardware prefetcher, and wherein the late prefetch calculator is also to calculate the second fraction of late prefetches based on the second number of late prefetches and the second number of prefetches.

3. The apparatus of claim 2, further comprising a fill buffer having a plurality of entries, each entry having a first location in which to store a first indication that the entry corresponds to the first hardware prefetcher and a second location in which to store a second indication that the entry corresponds to the second hardware prefetcher.

4. The apparatus of claim 3, further comprising a programmable register in which to store an interval clear value, the interval clear value to determine an interval for clearing the first location and the second location of each fill buffer entry.

5. The apparatus of claim 1, wherein the prefetch tuner also includes a window counter to measure a first window that is to determine a first frequency at which the first prefetch rate is to be adjusted.

6. The apparatus of claim 5, wherein the first frequency is a frequency at which the first prefetch rate is to be increased.

7. The apparatus of claim 6, wherein the window counter is also to measure a second window that is to determine a second frequency at which the second prefetch rate is to be decreased.

8. The apparatus of claim 1, wherein the prefetch tuner also includes a hold time counter to measure an elapsed hold time that is to determine a period during which the first prefetch rate is to be held constant.

9. A method comprising:
requesting, by a first hardware prefetcher, a first prefetch of a line of data;
setting a first indicator in a fill buffer entry to indicate that the line of data is requested by the first hardware prefetcher;
incrementing a first prefetch counter in response to setting the first indicator, the first prefetch counter corresponding to the first hardware prefetcher;
requesting, by a second hardware prefetcher, a second prefetch of the line of data;
setting a second indicator in the fill buffer entry to indicate that the line of data is also requested by the second hardware prefetcher;
incrementing a second prefetch counter in response to setting the second indicator, the second prefetch counter corresponding to the second hardware prefetcher;
detecting a late prefetch of the line of data;
incrementing a first late prefetch counter in response to detecting the late prefetch, the first late prefetch counter corresponding to the first hardware prefetcher;
incrementing a second late prefetch counter in response to detecting the late prefetch, the second late prefetch counter corresponding to the second hardware prefetcher;
detecting expiration of a first window that determines a first frequency at which a first prefetch rate is to be adjusted, the first prefetch rate corresponding to the first hardware prefetcher; and
calculating, in response to detecting expiration of the first window, a first fraction of late prefetches based on the first late prefetch counter divided by the first prefetch counter.

10. The method of claim 9, further comprising comparing, in response to detecting expiration of the first window, the first fraction of late prefetches to a first late prefetch threshold.

11. The method of claim 10, further comprising increasing the first prefetch rate in response to determining that the first fraction of late prefetches is above the first late prefetch threshold.

12. The method of claim 11, further comprising:
detecting expiration of a second window that determines a second frequency at which a second prefetch rate is to be adjusted, the second prefetch rate corresponding to the second hardware prefetcher;
calculating, in response to detecting expiration of the second window, a second fraction of late prefetches based on the second late prefetch counter and the second prefetch counter;
comparing, in response to detecting expiration of the second window, the second fraction of late prefetches to a second late prefetch threshold; and
increasing the second prefetch rate in response to determining that the second fraction of late prefetches is above the second late prefetch threshold.

13. The method of claim 10, further comprising comparing a first hold time counter to a first hold time threshold in response to determining that the first fraction of late prefetches is not above the first late prefetch threshold.

14. The method of claim 13, further comprising decreasing the first prefetch rate in response to determining that the first hold time counter is not below the first hold time threshold.

15. The method of claim 9, further comprising:
programming, by system software, an interval clear value in an interval clear register to specify a clear interval; and
clearing the first indicator and the second indicator in the fill buffer entry in response to detecting expiration of the clear interval.

16. A system comprising:
a system memory;
a processor including:
a processor core;
a cache memory;
a first hardware prefetcher to prefetch data for the processor core from the system memory to the cache memory;
a prefetch tuner to adjust a first prefetch rate of the first hardware prefetcher based on a first fraction of late prefetches, the prefetch tuner including a first late prefetch counter to count a first number of late prefetches for the first hardware prefetcher, a first prefetch counter to count a first number of total prefetches for the first hardware prefetcher, and a late prefetch calculator to calculate the first fraction of late prefetches based on the first number of late prefetches divided by the first number of total prefetches.

17. The system of claim 16, wherein the processor also includes:
a second hardware prefetcher and wherein the prefetch tuner is also to adjust a second prefetch rate of the second hardware prefetcher based on a second fraction of late prefetches independently from the first prefetch rate, the prefetch tuner also including a second late prefetch counter to count a second number of late prefetches for the second hardware prefetcher and a second prefetch counter to count a second number of prefetches for the second hardware prefetcher, and wherein the late prefetch calculator is also to calculate the second fraction of late prefetches based on the second number of late prefetches and the second number of prefetches; and
a fill buffer having a plurality of entries, each entry having a first location in which to store a first indication that the entry corresponds to the first hardware prefetcher and a second location in which to store a second indication that the entry corresponds to the second hardware prefetcher.

* * * * *